No. 757,738. PATENTED APR. 19, 1904.
P. J. GROSS.
MECHANISM FOR OPERATING VALVES OF TANKS FOR WATER CLOSETS.
APPLICATION FILED MAR. 26, 1903. RENEWED FEB. 27, 1904.
NO MODEL. 2 SHEETS—SHEET 1.
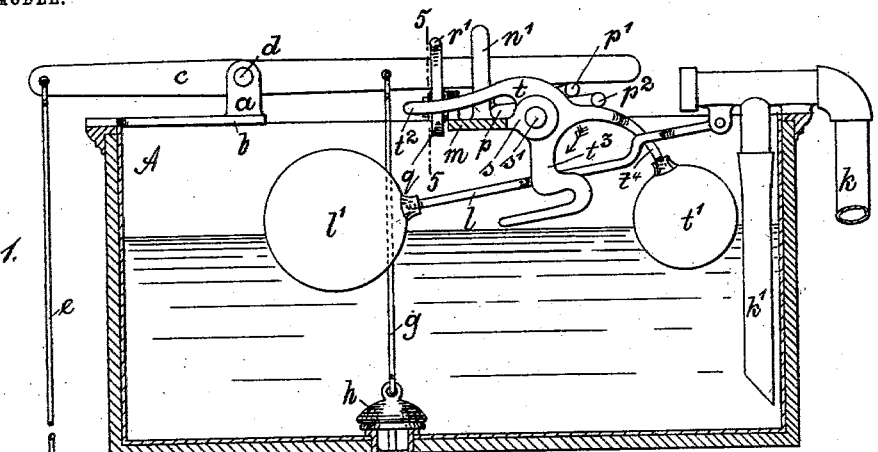
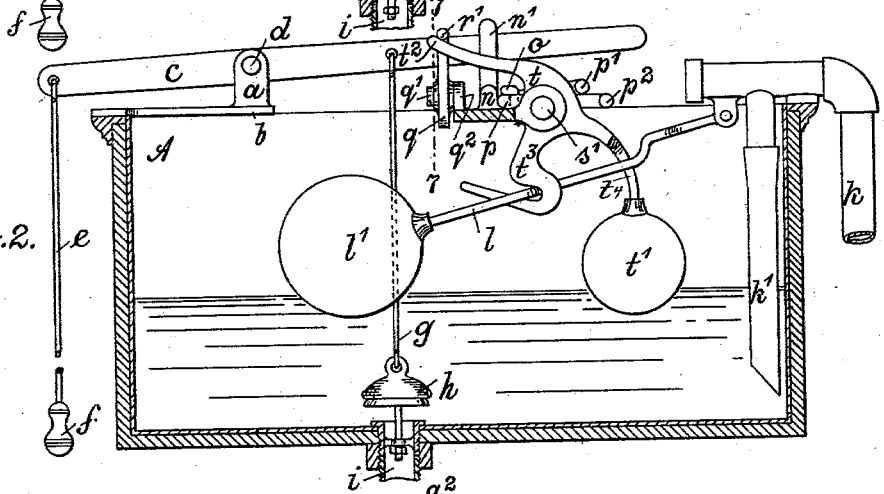
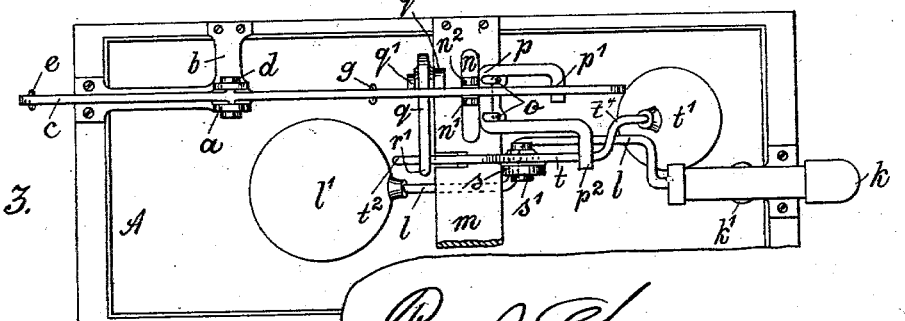

No. 757,738. PATENTED APR. 19, 1904.
P. J. GROSS.
MECHANISM FOR OPERATING VALVES OF TANKS FOR WATER CLOSETS.
APPLICATION FILED MAR. 26, 1903. RENEWED FEB. 27, 1904.
NO MODEL. 2 SHEETS—SHEET 2.
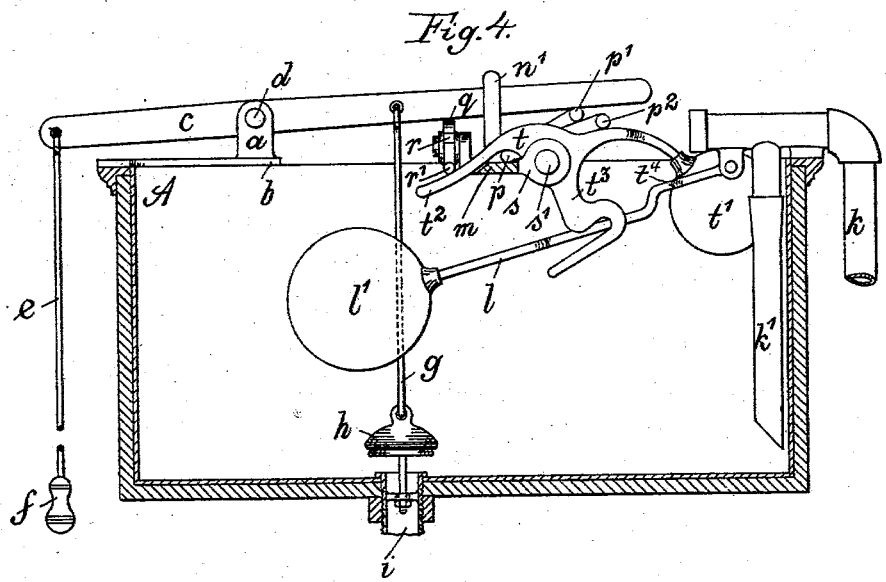
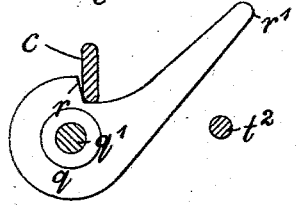
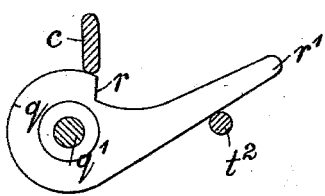
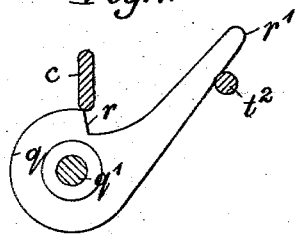

No. 757,738. Patented April 19, 1904.

UNITED STATES PATENT OFFICE.

PETER J. GROSS, OF BROOKLYN, NEW YORK, ASSIGNOR OF TWO-THIRDS TO FREDERICK FREY AND GEORGE BLANK, OF BROOKLYN, NEW YORK.

MECHANISM FOR OPERATING VALVES OF TANKS FOR WATER-CLOSETS.

SPECIFICATION forming part of Letters Patent No. 757,738, dated April 19, 1904.

Application filed March 26, 1903. Renewed February 27, 1904. Serial No. 195,549. (No model.)

*To all whom it may concern:*

Be it known that I, PETER J. GROSS, a resident of Brooklyn, county of Kings, and State of New York, have invented certain new and useful Improvements in Mechanisms for Operating Valves of Tanks for Water-Closets, of which the following is a full, clear, and exact specification, reference being had to the accompanying drawings, wherein—

Figure 1 is a sectional view of a water-tank, showing in elevation the mechanism constructed according to my invention for operating the valves in the position when the tank is filled and the valves closed. Fig. 2 is a similar view like Fig. 1, but showing the valves open and the mechanism for operating them in position immediately preceding to that of closing the outlet-valve. Fig. 3 is a plan view of the tank and mechanism, showing the parts in the same position as shown in Fig. 1. Fig. 4 is a view similar to Fig. 1, but showing the mechanism operating the valves in the position when automatically opening the outlet-valve to prevent an overflow of the tank. Fig. 5 is an enlarged detail view of a part of the mechanism as it appears in sectional view on line 5 5 indicated in Fig. 1. Fig. 6 is a similar view like Fig. 5, but showing the part in position when holding the lever operating the discharge-valve in lifted position. Fig. 7 is a similar enlarged detail partly-sectional view like Fig. 5, but showing the position of parts appearing on line 7 7 indicated in Fig. 2.

My invention relates to sanitary-plumbing appliances; and it consists of the hereinafter described mechanism for so operating the valves of a water-tank to prevent an excessive discharge and overflow of the water and, which is yet more important, to prevent ingress of air in the conduits, and thereby the rumbling and hissing noise attending the discharge of water from the tank and the refilling of the tank after the overflow is stopped.

Referring to the drawings, and more particularly to Fig. 1, A is a water-tank of the type and size usually employed. $a$ is a lug supported on bracket $b$, wherein lever $c$ is fulcrumed on pin $d$. To the outwardly-projecting end of lever $c$ a rope, rod, or chain $e$ is connected, terminating in handle $f$, whereby this lever is operated. Rod $g$ connects the other arm of the lever $c$ to valve $h$, seated in the outlet-tube $i$. $k$ is the inlet water-pipe, whose branch $k'$ is extended into the tank, terminating near the bottom thereof and provided with a valve of the ordinary kind, operated by lever $l$ and floating ball $l'$, secured to the end thereof in the usual manner—to wit, when the level of the water in the tank sinks and the ball is drawn downwardly the inlet-valve is opened by the downward swing of lever $l$, and when the level of the water rises, lifting float $l'$ to a certain predetermined height, the inlet-valve is closed. In addition to this mechanism which is ordinarily employed in such tanks I provide the following mechanism for the accomplishing of the stated purpose: Across the tank A is set platform $m$, whereon lug $n$ is secured, whose prongs $n'$ and $n^2$ serve as guides for the lever $c$. Adjoining these prongs hooks $o$ are provided, and on these hooks is fulcrumed the lever $p$. On the opposite side of the platform lug $q^2$ is affixed to it or made integral therewith. To this lug a drop-trigger $q$ is pivoted, turning freely on pin $q'$, screwed or otherwise secured in the lug. The drop-trigger $q$ is shown in Figs. 5, 6, and 7 on enlarged scale. Its head is cam-shaped and recessed at $r$ and extended into a finger $r'$, wherewith another part of the mechanism engages, as will be explained later on. On the other side of the platform a lug $s$ is secured thereto or made integral therewith, and a double-armed lever $t$ is fulcrumed thereto to turn on pin $s'$. On the end of the depending arm $t^4$ of this lever a float $t'$ is set, operating this lever by the inflow and outflow of the water. The other end $t^2$ of lever $t$ is extended to engage finger $r'$ of the drop-trigger. In addition to these two arms lever $t$ is provided with a third arm $t^3$, depending beneath lever $l$ and hooked to engage this latter lever $l$, as shown in Fig. 2. The hooked part of arm $t^3$ extends underneath the bent portion of lever $l$ in all positions of the mechanism.

The form of lever $p$ is shown in Fig. 3 of the drawings. The bent end of its arm $p'$ extends underneath lever $c$, and the bent end of its arm $p^2$ extends across the depending arm $t^4$ of lever $t$. Hooks $o$ are shaped to allow turning of the lever $p$; but its downward motion is limited by the projecting base-plate of these hooks.

The operation of this mechanism is as follows: Starting with the position shown in Fig. 1, the tank is filled to the desired level. The lever $c$ is in its lowermost position and in contact with arm $p'$ of lever $p$. Both valves are closed, and lever $c$ rests in recess $r$ of the drop-trigger $q$, thereby holding the latter in its uppermost position. (Shown in Fig. 5.) Levers $l$ and $t$ are disengaged from each other, the latter being also disengaged from finger $r'$ of the drop-trigger. Arm $p^2$ of lever $p$ rests on arm $t^4$ of lever $t$. When handle $f$ is pulled, lever $c$ is lifted and trigger $q$ drops, turning on its pivot until arrested by arm $t^3$. Thereby recess $r$ is moved out of alinement with lever $c$, and when the pull on handle $f$ is released the lever $c$ drops on the cam-shaped head of the drop-trigger. (See Fig. 6.) Thus valve $h$ is held open, and the water flows from tank A through outlet $i$ into the bowl. The level of the water in the tank sinks, and both floats $l'$ and $t'$ descend with it. This descending motion of float $t'$ causes lever $t$ to turn on its pivot in the direction of the arrow indicated in Fig. 1, whereby the hooked arm $t^3$ of this lever is brought in engagement with lever $l$, hooks this lever, and thereby prevents further sinking of float $l'$ and the resulting excessive opening of the inlet-valve. Float $t'$ continues to sink, and its arm $t^2$, upon which the finger $r'$ of the drop-trigger has fallen when lever $c$ was lifted, raises the drop-trigger again into such position where recess $r$ is in alinement with lever $c$. This occurs when float $t'$ is in position shown in Fig. 2. Trigger $q$ is then ready for engagement with lever $c$. Then lever $c$ drops, drawn by its own weight and by the pressure of water on valve $h$, into recess $r$ of drop-trigger $q$, as shown in Fig. 5, thereby closing valve $h$ upon the outlet-pipe $i$. At this stage there is yet sufficient water left in the tank to prevent any air entering into the outlet-tube $i$, and the outflow of water occurs without any noise. The end of inflow-tube $k'$ is never exposed, and therefore no air can enter it. Float $l'$ is held by the engagement of arm $t^3$ with lever $l$ in the position shown in Fig. 2 until as float $t'$ rises with the inflowing water arm $t^3$ is disengaged from lever $l$, float $l'$ then rising to the surface and closing the inlet-valve. Float $t'$ being disengaged from lever $l$ swings lever $t$ in its position shown in Fig. 1, and the apparatus is ready for its next action.

If for some reason the inlet-valve should not operate and the flow of water should continue, the overflowing of the tank is prevented by the mechanism acting upon the lever $p$ in the following manner: As hereinbefore stated, arm $p^2$ of this lever is in position to be engaged by the depending arm $t^4$ of lever $t$ when this lever swings back to its position shown in Fig. 1, while lever $c$ rests on the other arm $p'$ when sunk in recess $r$ of the drop-trigger. Should the level of the water rise above its normal position, as shown in Fig. 1, float $t'$ being carried upwardly turns lever $t$ farther in the direction opposite to the arrow indicated in Fig. 1 and lifts lever $p$, and thereby also lever $c$ and valve $h$, connected with it. The outflow being thus opened, the water escapes from tank through pipe $i$ until the normal level is reached, when lever $c$ again drops into its normal position, thus closing valve $h$, governing the outflow. Should the inflow of water gain, the float $t'$ will raise lever $c$ until it is wholly disengaged from recess $r$ of the drop-trigger $q$. The drop-trigger then turns, thus holding the lever $c$ in raised position, fully opening valve $h$, connected to it, and the water is discharged from the tank in the same manner as if handle $f$ had been pulled to set the mechanism in action.

I claim as my invention—

1. Mechanism for operating the inflow and outlet valves of a water-tank comprising a lever, means for operatively connecting it with the outlet-valve, and means for manually operating the lever; a drop-trigger, having a cam-shaped head, a finger, and a recess, pivoted underneath the lever; a lever, having one end operatively connected to the inflow-valve, a float set on its other end; a three-armed lever fulcrumed in position to engage with one of its arms the finger of the drop-trigger, with another arm the lever connected to the inflow-valve, and a float secured to the end of its third arm, substantially as herein shown and described.

2. Mechanism for automatically opening the outlet-valve of a water-tank to prevent an overflow, the mechanism comprising a lever, means for operatively connecting the lever with the outlet-valve of the tank; a drop-trigger, pivoted underneath the lever and having a cam-shaped head, a recess and a finger; a lever, fulcrumed to the tank in position to engage the finger of the drop-trigger; a float affixed to one end of this lever; a lever fulcrumed in position to engage with one arm the lever operating the outlet-valve, and with the other the lever to which the float is affixed; substantially as herein shown and described.

3. Mechanism for operating the inflow and outlet valves of a water-tank, comprising a lever, means for operatively connecting it with the outlet-valve, and means for manually operating the lever; a drop-trigger having a cam-shaped head, a finger, and a recess, pivoted underneath the lever; a lever having one end operatively connected to the inflow-valve, a float on its other end; a three-armed lever, fulcrumed in position to engage with one of its arms the finger of the drop-trigger, and with another arm the lever connected to the inflow-valve, and a float secured to the end of its third arm; a lever, fulcrumed in position to engage with one arm the lever operating the outlet-valve, and with the other arm, the three-armed lever, substantially as herein shown and described.

PETER J. GROSS.

Witnesses:
JOHN A. PAULSON,
M. A. HELMKE.